United States Patent
Singh (10) Patent No.: US 6,389,278 B1
(45) Date of Patent: May 14, 2002

(54) SYSTEMS AND METHODS FOR IDENTIFYING A SERVICE PROVIDER FROM A WIRELESS COMMUNICATOR BASED ON CATEGORIES OF SERVICE PROVIDERS THAT ARE CALLED

(75) Inventor: Mona Singh, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/313,298

(22) Filed: May 17, 1999

(51) Int. Cl.$^7$ ............................................... H04M 3/42
(52) U.S. Cl. ..................... 455/414; 455/422; 455/425; 455/556; 455/566; 455/575
(58) Field of Search ................................ 455/414, 415, 455/417, 422, 423, 424, 445, 575, 425, 456, 556, 557, 566; 379/207.12

(56) References Cited

U.S. PATENT DOCUMENTS

| | | | |
|---|---|---|---|
| 5,027,384 A | | 6/1991 | Morganstein ................. 379/67 |
| 5,610,980 A | * | 3/1997 | Johnson et al. ................. 380/4 |
| 5,694,472 A | * | 12/1997 | Johnson et al. ............... 380/25 |
| 5,737,539 A | * | 4/1998 | Edelson et al. ............. 395/203 |
| 5,778,068 A | * | 7/1998 | Johnson et al. ............... 380/25 |
| 5,819,173 A | * | 10/1998 | Lawrence et al. ........... 455/414 |
| 5,845,255 A | * | 12/1998 | Mayaud .......................... 705/3 |
| 5,948,040 A | * | 9/1999 | DeLorme et al. ........... 701/201 |
| 6,119,133 A | * | 9/2000 | Nusbickel et al. .......... 707/205 |
| 6,173,045 B1 | * | 1/2001 | Smith ....................... 379/93.23 |
| 6,275,710 B1 | * | 8/2001 | Oinonen et al. ............. 455/466 |

FOREIGN PATENT DOCUMENTS

| | | |
|---|---|---|
| WO | WO 98/09463 | 3/1998 |
| WO | WO 98/59506 | 12/1998 |

OTHER PUBLICATIONS

International Search Report, PCT/US00/09669, Mar. 5, 2001.

IBM Corporation, *Dynamic Loading of Locale Specific HTML Page Choosing Particular Set of Localised HTML Pages With Pages Determined By Locale Application is Currently Running in With Application Dynamically Selecting Correct Set of Pages to Display in Web Browser Without Any User Interaction*, RD–407091, Mar. 10, 1998, 2 pp.

* cited by examiner

*Primary Examiner*—Daniel Hunter
*Assistant Examiner*—Yemane Woldetatios
(74) *Attorney, Agent, or Firm*—Myers Bigel Sibley & Sajovec (57) ABSTRACT

A service provider such as a physician or an automobile mechanic is identified from a wireless communicator based on categories of service providers such as physicians or automobile mechanics. In particular, a radiotelephone call is initiated from the wireless communicator to a first telephone number that corresponds to a first service provider of a first category, for example a first physician. The wireless receiver then detects that the radiotelephone call is not successfully completed, for example by detecting that a busy signal is obtained from the first telephone number, by detecting that a radiotelephone call to the first telephone number is repeatedly initiated during a predetermined time and/or by detecting that radiotelephone calls to multiple telephone numbers corresponding to service providers of the first category are initiated during a predetermined time. If the radiotelephone call is not successfully completed, a listing is obtained at the wireless communicator of at least a second telephone number that corresponds to at least a second service provider of the first category. At least part of the listing is displayed on the wireless communicator, so that a radiotelephone call may be initiated from the wireless communicator in response to selection of the second service provider of the first category. Thus, in the example where the service provider is a physician, if a radiotelephone call to a first physician is initiated and is not successfully completed, a listing of physicians may be displayed on the wireless communicator display so that other physicians may be called.

36 Claims, 7 Drawing Sheets

SYSTEMS AND METHODS FOR IDENTIFYING A SERVICE PROVIDER FROM A WIRELESS COMMUNICATOR BASED ON CATEGORIES OF SERVICE PROVIDERS THAT ARE CALLED

FIELD OF THE INVENTION

This invention relates to wireless communicators, and more particularly to systems and methods for using wireless communicators.

BACKGROUND OF THE INVENTION

Wireless communicators are widely used for personal communications. As used herein, the term "wireless communicator" includes a cellular radiotelephone with a multi-line display, a Personal Communications System (PCS) terminal that may combine a cellular radiotelephone with data processing, facsimile and data communications capabilities, a Personal Digital Assistant (PDA) that can include a radiotelephone, pager, internet/intranet access, web browser, organizer, calendar and/or a Global Positioning System (GPS) receiver, and conventional laptop and/or palmtop receivers that include radiotelephone transceivers. Wireless communicators also may be referred to as "pervasive computing" devices.

Since wireless communicators can have the capabilities of sending and receiving telephone calls, faxes, email, pages and web pages, they often may be used in environments and circumstances where conventional computers and telephones generally are not used. Accordingly, it may be generally desirable to make at least one of the above-mentioned functions location-sensitive. This contrasts with conventional desktop environments wherein the desktop is generally used in the same physical setting each time, and usually operate in the same or similar environment.

One attempt at making a wireless communicator location-sensitive is described in published Research Disclosure Document No. RD-0407091 having an extended title *"Dynamic Loading of Locale Specific HTML Page Choosing Particular Set of Localised HTML Pages With Pages Determined by Locale Application is Currently Running in With Application Dynamically Selecting Correct Set of Pages to Display in Web Browser Without Any User Interaction. As described therein, a locale-specific HTML page is dynamically loaded for a web browser, with an application dynamically selecting a correct set of pages to display in the web browser without any user interaction. However, as wireless communicators continue to proliferate, there continues to be a need for improved systems and methods for providing location-sensitive features in wireless communicators.*

SUMMARY OF THE INVENTION

The present invention provides systems and methods for identifying a service provider such as a physician or an automobile mechanic from a wireless communicator, based on categories of service providers such as physicians or automobile mechanics. It will be understood that a service provider can include a vendor of goods.

In particular, a radiotelephone call is initiated from the wireless communicator to a first telephone number that corresponds to a first service provider of a first category, for example a first physician. The wireless receiver then detects that the radiotelephone call is not successfully completed, for example by detecting that a busy signal is obtained from the first telephone number, by detecting that a radiotelephone call to the first telephone number is repeatedly initiated during a predetermined time and/or by detecting that radiotelephone calls to multiple telephone numbers corresponding to service providers of the first category are initiated during a predetermined time.

If the radiotelephone call is not successfully completed, a listing is obtained at the wireless communicator of at least a second telephone number that corresponds to at least a second service provider of the first category. At least part of the listing is displayed on the wireless communicator, so that a radiotelephone call may be initiated from the wireless communicator in response to selection of the second service provider of the first category. Thus, in the example where the service provider is a physician, if a radiotelephone call to a first physician is initiated and is not successfully completed, a listing of physicians may be displayed on the wireless communicator display so that other physicians may be called.

The initial radiotelephone call may be initiated by displaying a prestored listing of service providers on the wireless communicator, including the first service provider of the first category. A stored directory of the wireless communicator user's frequently used numbers may be stored in the wireless communicator, along with an indication of a category of service provider. Alternatively, in more sophisticated wireless communicators, "electronic business cards" may be stored in the wireless communicator, that identify a service provider as well as an associated category of service.

When a listing of at least a second telephone number is obtained at the wireless receiver, the listing of at least a second service provider of the first category preferably corresponds to the geographic location of the wireless communicator. The geographic location of the wireless communicator may be identified, for example, using a built-in Global Positioning System (GPS) receiver or by identifying a geographic location of a base station and/or a satellite beam over which the wireless communicator is communicating. A listing of at least a second telephone number that corresponds to at least a second service provider of the first category in the geographic location is obtained. Preferably, a Yellow Pages directory listing is obtained from the Internet, corresponding to the geographic location of the wireless communicator. Other directories may be used.

According to another aspect of the invention, when a listing is wirelessly obtained, a default display for telephone number listings is first obtained and displayed. For example, a web browser may be used to obtain and display a Yellow Pages home page. The listing then is displayed either on the home page or on another web page. The home page may take an unacceptably long time to download to the wireless communicator, due to the graphics and/or animation thereof. Accordingly, if the default display cannot be obtained within a predetermined time, the listing is wirelessly obtained and displayed without first wirelessly obtaining and displaying the default display.

The above-described aspect of the invention may be used independent of the systems and methods for identifying a service provider based on categories of service providers. In particular, a default display for a wireless communicator may be wirelessly obtained if the default display can be wirelessly obtained within a predetermined time. The default display is displayed on the wireless communicator if the default display was obtained within the predetermined time. The desired information is displayed on the wireless communicator.

After displaying at least part of the listing on the wireless communicator, a radiotelephone call may be initiated to a telephone number that is contained in the at least part of the listing that is displayed on the wireless communication, in response to selection of the telephone number. Accordingly, if a wireless communicator user is unsuccessful in reaching a known service provider of a particular category, a listing of alternate service providers in that category may be obtained so that an alternate service provider may be readily selected. Improved systems and methods for using wireless communicators are thereby provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
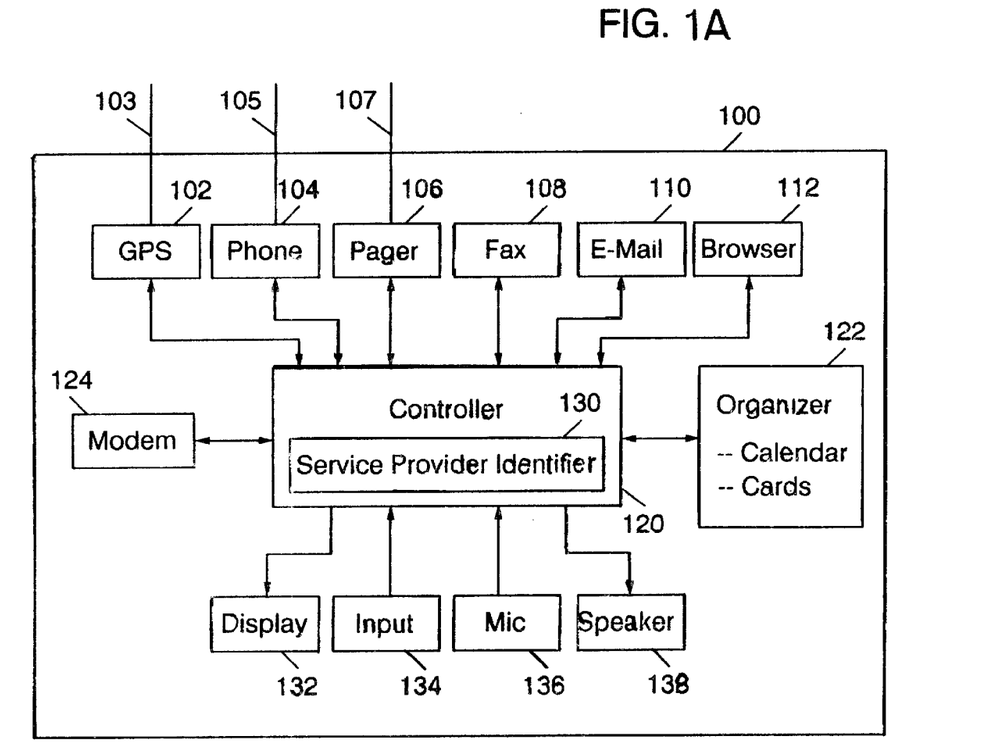
FIG. 1A is a simplified block diagram of wireless communicators according to the present invention.

Referring now to FIG. 1A, a simplified block diagram of wireless communicators according to the present invention now will be described. As shown in FIG. 1A, a wireless communicator is provided in a wireless communicator housing 100. Enclosed in the housing is one or more of a Global Positioning System (GPS) receiver 102, a wireless radiotelephone 104, a pager 106, a facsimile device 108, an email sender and receiver 110 and a World Wide Web browser 112. It will be understood that only some of these devices may be provided and that one or more of these devices may be integrated or combined in whole or in part. The GPS receiver 102, wireless radiotelephone 104 and pager 106 may include separate antennas 103, 105 and 107 respectively, or one or more of the antennas 103, 105 and 107 may be combined.

Still referring to FIG. 1A, the wireless communicator also may include a wireless or wired modem 124. An organizer 122 also may be included, to provide calendar functions, electronic business cards and/or other functions.

As is well known to those having skill in the art, an electronic business card ("card") is an extension of a speed-dial directory. For a given service provider, a card may include an identification of how to contact the service provider including telephone numbers, fax numbers and/or email addresses. Information also may be included as to when that service provider may be contacted using different telephone numbers, fax numbers and/or email addresses. An indication preferably also is provided as to what category of services are provided by that service provider, if any. An indication also may be provided as to the user's estimate of quality of these services, based on prior experience.

The contact information and the services that are provided may be obtained by scanning a business card or may be entered by a user manually. The identification of when the service provider may be contacted using different telephone numbers and the estimate of quality may be provided by the user separate from the business card identification.

The user can view the available cards in various ways. For example, the user can view the available cards by name, by available services, or even by the current time of contact, so as to consider service providers that are available at that time.

The user of the wireless communicator can initiate a radiotelephone call by selecting a specific recipient. It will also be understood that the user can create a card for the intended recipient when initiating a call.

Continuing with the description of FIG. 1A, a user interface also is provided including a display 132, an input system 134 that may include a touch screen, pointing device and/or keys, a microphone 136 and/or a speaker 138.

A controller 120 also is provided for controlling at least one of the GPS receiver 102, the wireless radiotelephone 104, the pager 106, the facsimile 108, the email system 110, the web browser 112, the organizer 122, the modem 124, the display 132, the input device 134, the microphone 136 and the speaker 138. The controller may be embodied as systems (apparatus), methods and/or computer program products. Accordingly, the present invention may take the form of an entirely hardware embodiment, an entirely software embodiment or an embodiment combining software and hardware aspects.

It also will be understood by those having skill in the art that the controller 120 and one or more of the other components in the wireless communicator housing 100 may be integrated into one or more integrated circuits. The controller 120 also may be a distributed controller that is distributed over one or more of the other components of the wireless communicator.

Figure 1B:
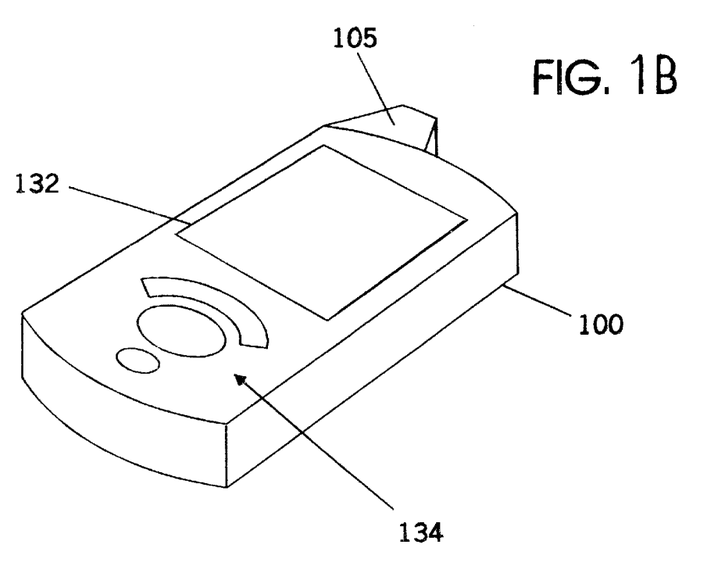
FIG. 1B is a perspective view of a wireless communicator of FIG. 1A.

FIG. 1B is a perspective view of a wireless communicator of FIG. 1A. The design and operation of a wireless communicator, and the individual components thereof, as described above, are well known to those having skill in the art and need not be described further herein.

Returning to FIG. 1A, according to the present invention, a service provider identifier 140 may be provided. The service provider identifier 140 may be provided as part of the controller 120, as part of one of the other components of the wireless communicator, or may be distributed over two or more of the components of the wireless communicator. According to the invention, the service provider identifier 140 identifies a service provider based on categories of service providers.

Figure 2:
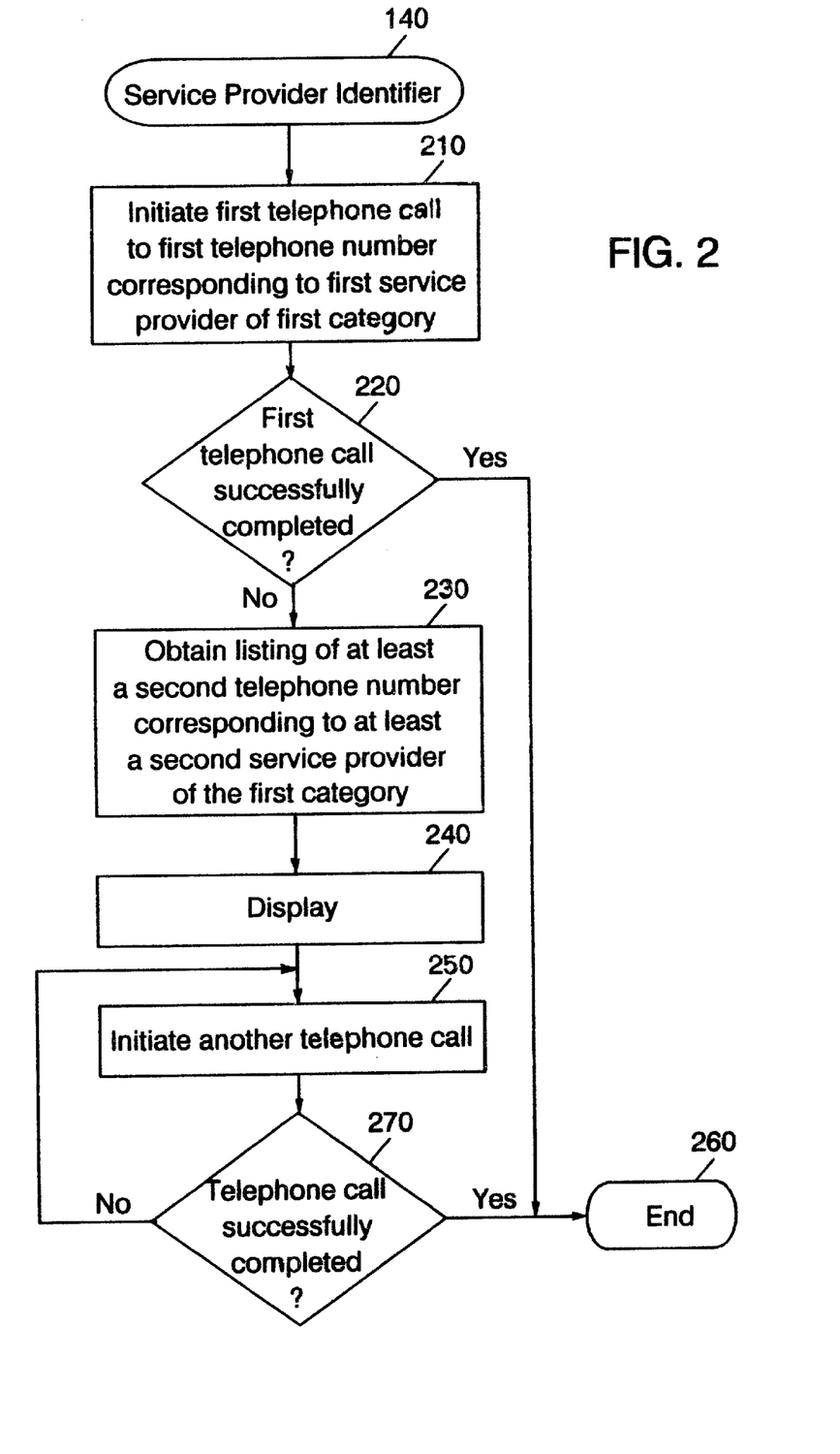
FIG. 2 is a flowchart illustrating overall operations for identifying a service provider according to the present invention.
Figure 5:
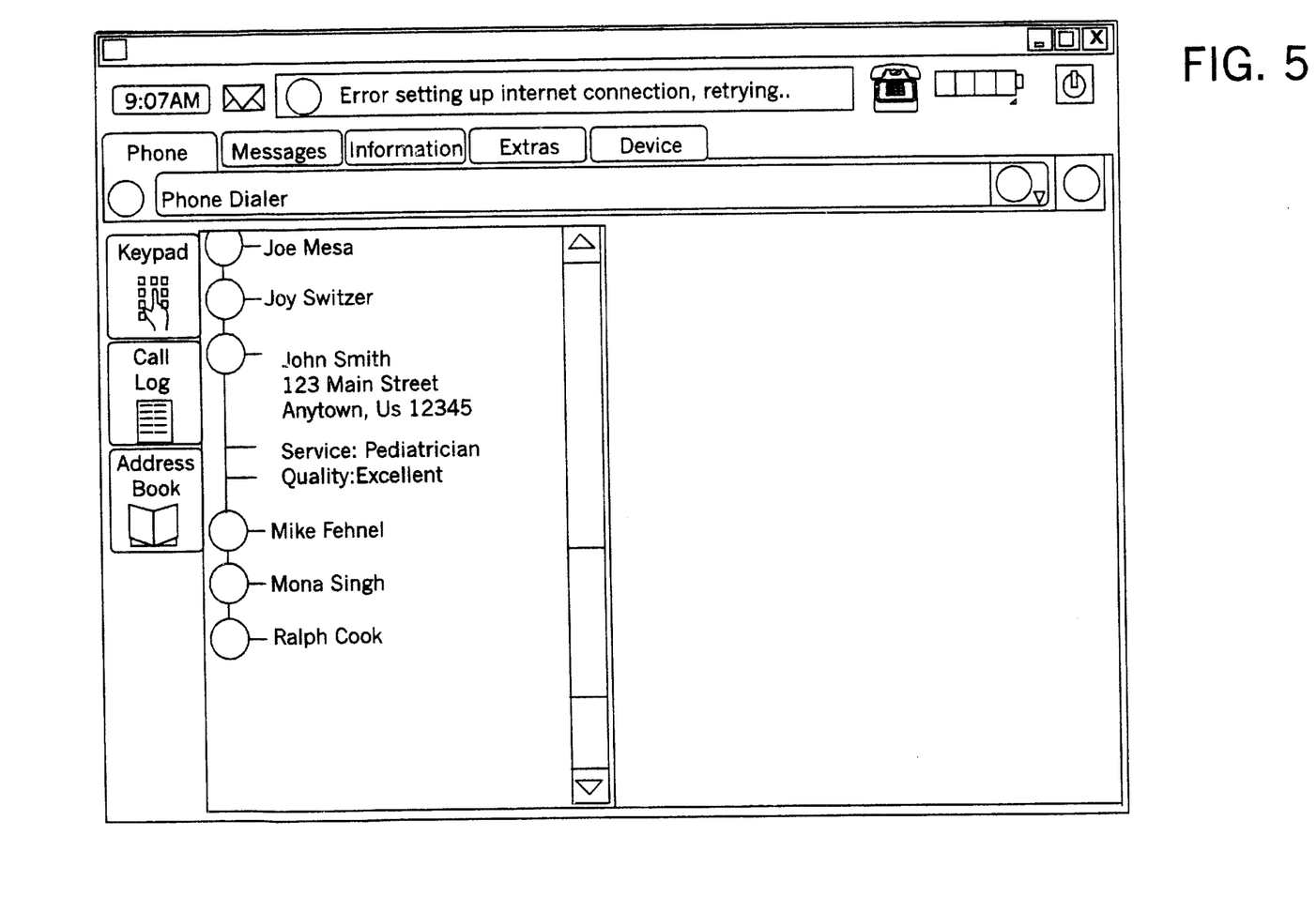
FIGS. 5–7 illustrates displays of wireless communicators of FIGS. 1A and 1B according to the present invention.

Overall operations of the service provider identifier 140 of FIG. 1A will be described in connection with FIG. 2. As shown in FIG. 2, a service provider is identified by initiating a radiotelephone call from the wireless communicator to a first telephone number that corresponds to a first service provider of a first category at Block 210. For example, a radiotelephone call is initiated from the wireless communicator to a first telephone number that corresponds to a first service provider "Dr. Smith" of a first category "physician". The radiotelephone call may be initiated by displaying a prestored listing of service providers on the wireless communicator, including the first service provider of the first category. For example, a plurality of cards may be displayed that are organized by category or by some other criteria. FIG. 5 illustrates a display 132 of a wireless communicator of FIGS. 1A and 1B, including a card display thereon. The user then selects an appropriate card corresponding to the first service provider of the first category. Other techniques of storing a plurality of telephone numbers and identifiers in a wireless communicator are well known to those having skill in the art and need not be described further herein.

Still referring to FIG. 2, at Block 220, the test is made as to whether the radiotelephone call is successfully completed. The test may be made by detecting that a busy signal was obtained from the first telephone number. Alternatively, it may be detected that a radiotelephone call to the first telephone number is repeatedly initiated during a predetermined time. In another embodiment, it may be detected that telephone calls to multiple telephone numbers corresponding to service providers of the same category are initiated during a predetermined time. Combinations of these scenarios and other scenarios also may be tested for, in order to detect whether the telephone call was successfully completed.

It will be understood that the predetermined period may be preset or may be set by a user. A period of five to ten minutes may be appropriate for typical cases, for example when trying to contact a physician or a mechanic. Continuing with the description of FIG. 2, if a radiotelephone call is successfully completed, then operations end at Block 260. However, if the radiotelephone call is not successfully completed at Block 220, then at Block 230 a listing of at least a second telephone number corresponding to at least a second service provider of the first category is obtained. Preferably, the listing is obtained by identifying a geographic location of the wireless communicator, and then wirelessly obtaining at least a second telephone number that corresponds to at least a second service provider of the first category in the geographic location. The geographic location may be identified using the GPS receiver 102, by identifying a cellular base station and/or satellite beam that is being communicated with by wireless radiotelephone 104, by identifying the location from which a page 106 was transmitted, by combinations of these techniques or by any other technique. Preferably, the listing of at least a second telephone number is obtained by wirelessly obtaining a Yellow Page directory listing from the Internet. The Yellow Page listing preferably includes at least a second telephone number that corresponds to at least a second service provider of the first category, in the geographic location.

Figure 6:
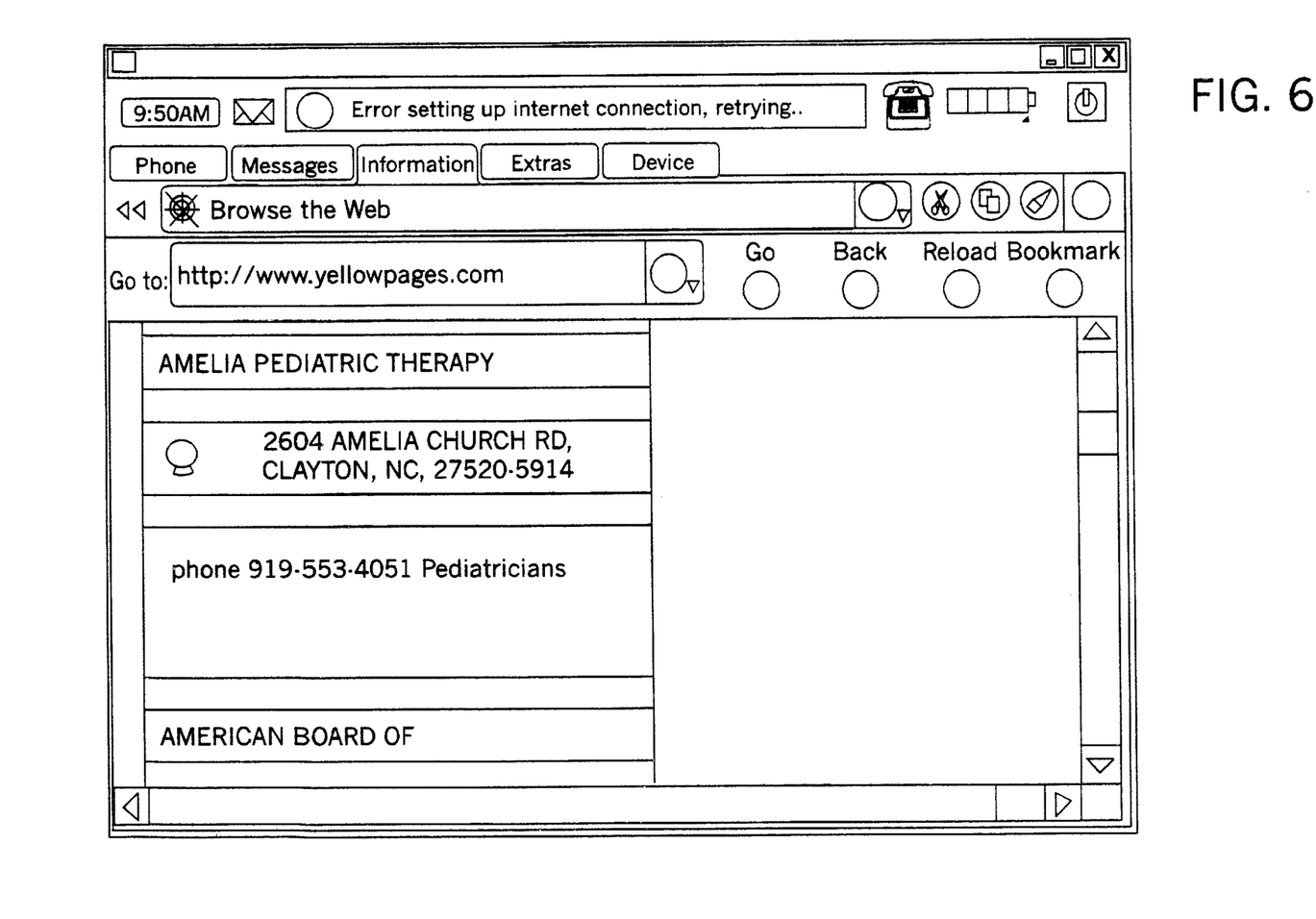

Continuing with the description of FIG. 2, at Block 240, at least part of the listing that was obtained in Block 230 is displayed on the display 132. FIG. 6 illustrates a display 132 of a wireless communicator of FIGS. 1A and 1B including a listing display thereon. Finally, at Block 250, a radiotelephone call is initiated to a telephone number in the at least part of the listing that is displayed, in response to user selection. If the radiotelephone call is successfully completed at Block 270, then operations end at Block 260. If not, yet another radiotelephone call may be initiated at Block 250 until a service provider of the first category is identified. Alternatively, if the radiotelephone call is not successfully completed at Block 270, operations may proceed back to Block 230 to obtain a broader listing of service providers. For example, if a pediatrician is being sought but is not successfully identified, a listing of all physicians may be obtained. Alternatively, if a pediatrician is not identified in the immediate geographical vicinity, the geographic scope of the listing may be expanded at Block 230.

Referring again to Block 230, may techniques may be used to obtain a listing of at least a second telephone number. The category of service provider which the wireless terminal user is most interested may first be determined. If the user asks to contact a specific category explicitly, then that category may be used. Thus, if the user attempts to contact a pediatrician, it may be inferred that the user is interested in finding a pediatrician. Alternatively, if a user calls a series of service providers of the same category, it may be inferred that the service is in the intersection of the services provided by the last entries E called in the last time unit T, where E and T may be user configurable or may be automatically set. For example, if the user calls Dr. Smith who is a general practitioner and a pediatrician, and then calls Dr. Jones who is a pediatrician, the device may infer pediatrician as the desired category. Accordingly, a category for the first telephone number or a series of telephone numbers is determined directly or inferentially in order to obtain a listing of at least a second telephone number that corresponds to at least a second service provider of that category.

Figure 3:
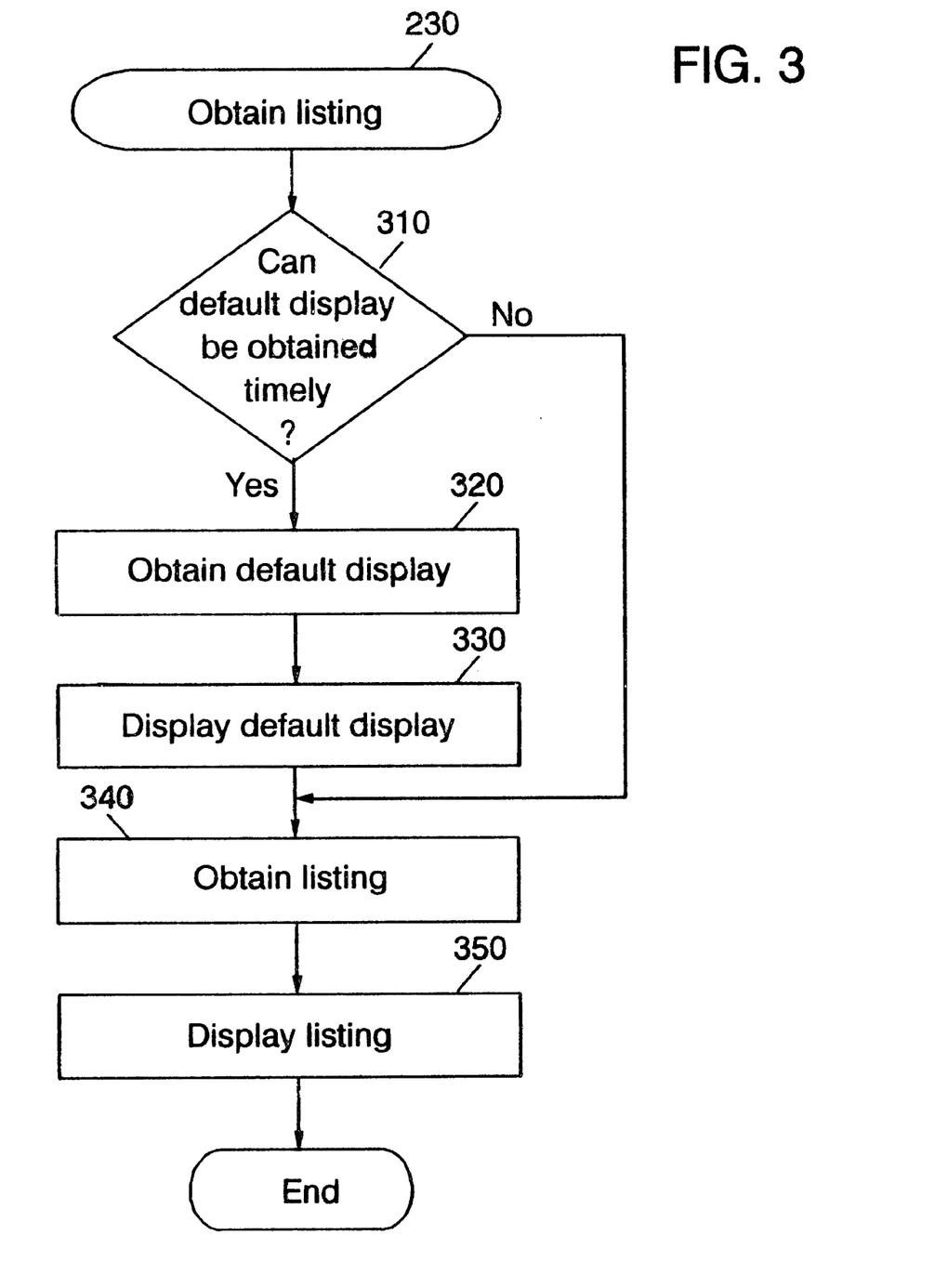
FIG. 3 is a flowchart illustrating operations for obtaining a listing according to the present invention.
Figure 7:
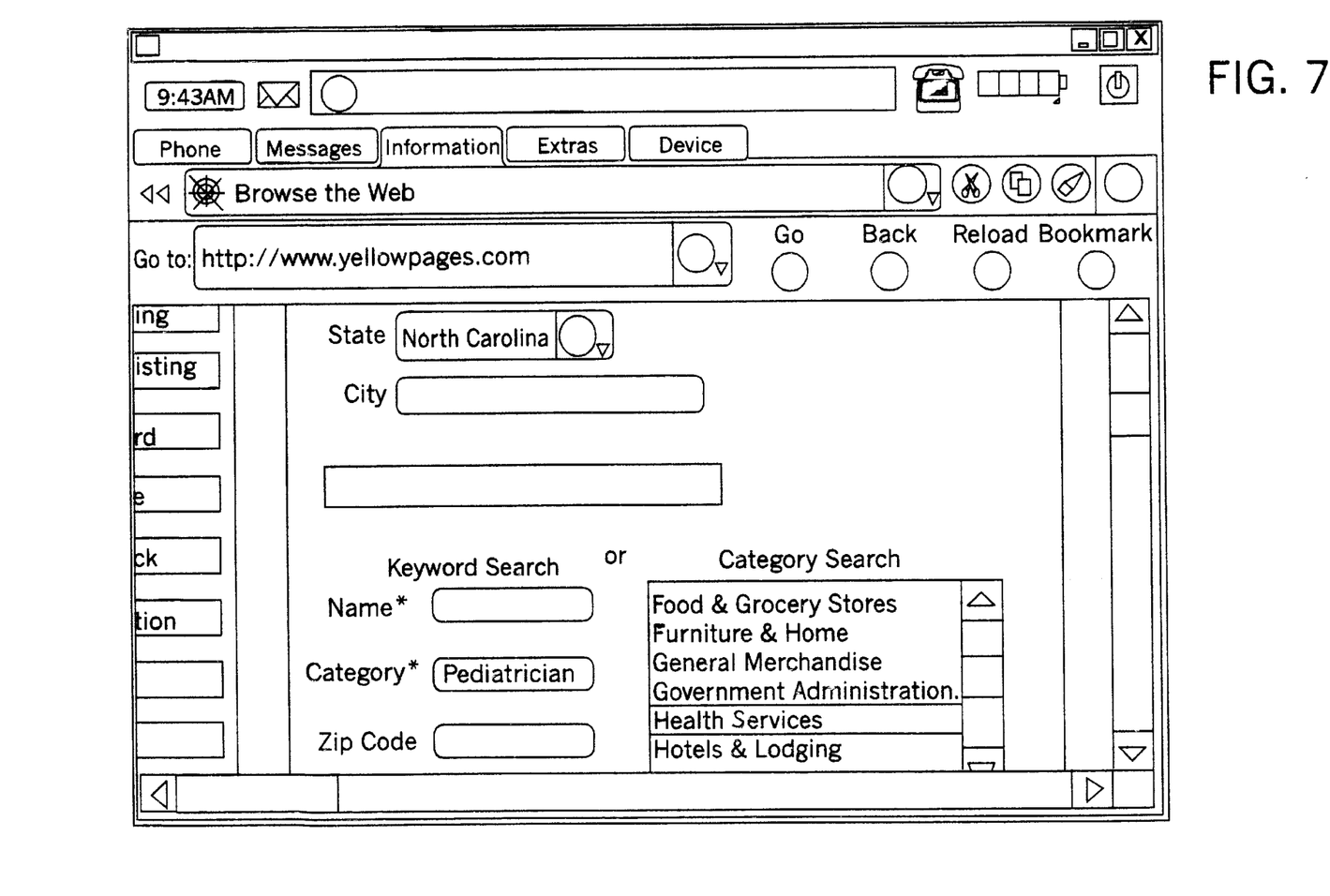

Referring now to FIG. 3, detailed operations for obtaining a listing (Block 230 of FIG. 2) according to an aspect of the present invention will now be described. As was described above, the listing is obtained using the browser 112 of FIG. 1 in conjunction with the wireless modem 124 and/or the wireless radiotelephone 104. As is well known to those having skill in the art, when a browser initially contacts a Uniform Resource Locator (URL) corresponding to the telephone listings, such as a Yellow Pages directory home page, a default home page is displayed. This home page may include complex graphics, advertising and/or other multimedia material. FIG. 7 illustrates a display 132 of a wireless communicator of FIGS. 1A and 1B including a Yellow Pages directory home page display.

Since it may be time-consuming to load this default display, the present invention performs a test at Block 310 in order to determine whether the default display can be obtained in a timely manner. If the default display can be obtained in a timely manner, then the default display is obtained at Block 320 and is displayed at Block 330. The browser 112 then is used to obtain a listing at Block 340 and to display the listing at Block 350. Alternatively, if a default display cannot be obtained in a timely manner at Block 310, then the browser is used to obtain the listing and display the listing without obtaining and displaying the default display. Thus, when the link is poor quality and/or high cost, the default page may be suppressed and a blank page may be displayed.

This aspect of the present invention may be used in other environments to display information on the display of a wireless communicator. A default display is obtained if the default display can be wirelessly obtained within a predetermined time. The default display is then displayed. The information is then obtained and displayed on the wireless communicator.

Figure 4:
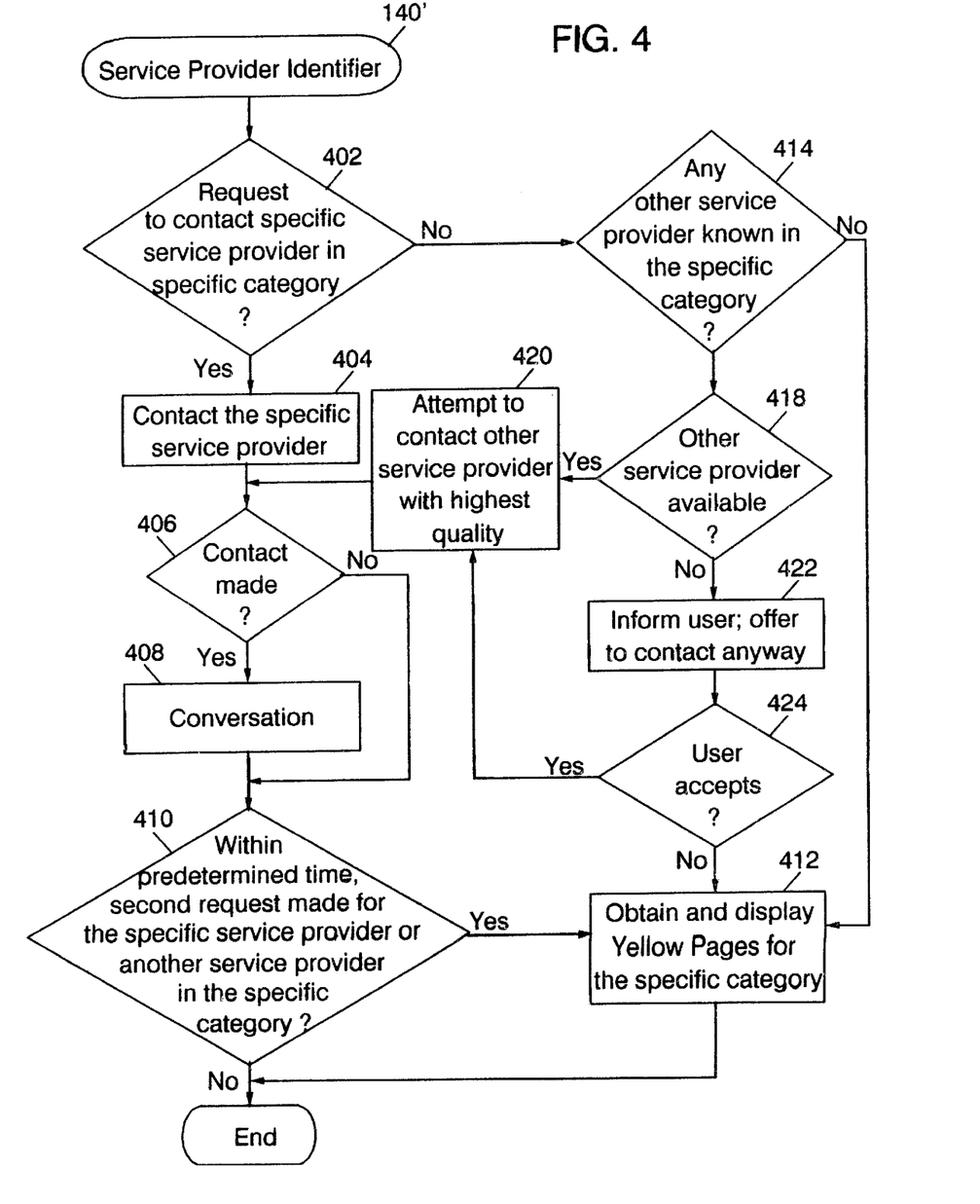
FIG. 4 is a flowchart illustrating detailed operations for identifying a service provider according to the present invention.

FIG. 4 is a flowchart that illustrates detailed operations for identifying service providers according to another embodiment of the invention. As shown in FIG. 4 at Block 402, a test is made as to whether the user has asked to contact a specific service provider of a specific category. If yes, then the wireless communicator contacts the specific service provider of the specific category at Block 404. A test is then made at Block 406 as to whether the contact succeeded. If the contact succeeded, then at Block 408, the user has a conversation with the specific service provider. A test is then made at Block 410 as to whether within a short time period the user asks to contact the same or a different service provider offering services in the specific category. If not, operations end. If yes, then at Block 412, if the contact failed or if the contact succeeded but the user asks for another service provider soon thereafter to indicate that the user did not receive satisfactory service, then the Yellow Pages for the specific category is obtained and displayed.

Returning again to Block 402, if the user did not ask to contact a specific service provider, then a test is made at Block 414 as to whether the user has asked to contact any service provider offering services of the specific category. If yes, then at Block 418 a test is made as to whether any such service provided is available now. If yes, an attempt is made at Block 420 to contact a known service provider with the highest quality of service. If no such service provider is available now, then the user may be informed, and the wireless communicator may offer to contact the service provider at Block 422. If the user indicates to proceed at Block 424, then an attempt is made to contact the service provider at Block 420. If not, then the Yellow Pages services for the specific category is again displayed at Block 412.

It will be understood that the Yellow Pages may be displayed and the user may be facilitated in selecting a service provider to contact, but the contact to the service provider preferably is not initiated automatically. The Yellow Pages preferably are displayed based on the specific category. The user preferably can browse up or down the Yellow Pages hierarchy as necessary. The wireless communicator may learn and reason about, for example, the Health Maintenance Organization (HMO) plan in which the user is enrolled so that, for example, a physician in that HMO is selected from the listing. However, the wireless communicator may not have this information, so that the radiotelephone call preferably is not automatically initiated. Thus, preferably, assistance is offered, but the ultimate decision to contact a second service provider may be up to the user.

It also will be understood that when the telephone-related applications are being used, the web browser generally is not in the foreground, because of the small amount of display area that may be available in the wireless communicator. However, the web browser need not be active or launched. Rather, according to the present invention, the web browser may be launched on the Yellow Pages URL. The user may be informed of this action through a status message, so that the user need not activate the browser. Thus, there need not be an interruption of the user's telephone activity. It also will be understood that the browser may be accessed using a data line for the web connection, even if the voice line is busy. Wireless communicators may include separate, concurrently usable, voice and data lines. Alternatively, the web browser may be multiplexed with the radiotelephone conversations.

The present invention may assume that standard categories of services are provided, so that they can be matched with the Yellow Pages listings. This may be a valid assumption because service providers may use names for their services that are easily recognizable by potential customers. Thus, service categories may converge on standard set of names. Moreover, Yellow Page directories may recognize more than one such name. For example, the service category "Doctors" may by included in a directory with a reference to physicians, which also is included. Moreover, if a unique service category cannot be inferred, the Yellow Pages for the likeliest used services all can be downloaded, with the most likely guess being first, and an indication may be provided that other services are available. The likeliest services may be selected based on which occurred the most frequently among the common services of the last service providers that were called within a predetermined time. Thus, for example, the wireless communicator may obtain the Yellow Page listings for pediatricians, with the Yellow Pages for general practitioners being available as the second choice. Accordingly, improved systems and methods for identifying a service provider based on categories of service providers may be provided.

Various aspects of the present invention were illustrated in detail in the figures, including block diagrams and flowchart illustrations. It will be understood that individual blocks of the figures, and combinations of blocks in the figures, can be implemented by computer program instructions. These computer program instructions may be provided to a processor or other programmable data processing apparatus to produce a machine, such that the instructions which execute on the processor or other programmable data processing apparatus create means for implementing the functions specified in the block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the block or blocks.

Accordingly, blocks of the figures support combinations of means for performing the specified functions, combinations of steps for performing the specified functions and program instruction means for performing the specified functions. It will also be understood that individual blocks of the figures, and combinations of blocks in the figures, can be implemented by special purpose hardware-based computer systems which perform the specified functions or steps, or by combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of identifying a service provider from a wireless communicator, comprising the steps of:

initiating a radiotelephone call from the wireless communicator to a first telephone number that corresponds to a first service provider of a first category;

detecting that the radiotelephone call is not successfully completed;

obtaining at the wireless communicator, a listing of at least a second telephone number that corresponds to at least a second service provider of the first category in response to the step of detecting that the radiotelephone call is not successfully completed; and displaying at least part of the listing on the wireless communicator.

2. A method according to claim 1 wherein the initiating step comprises the steps of:

displaying a prestored listing of service providers on the wireless communicator, including the first service provider of the first category; and initiating a radiotelephone call from the wireless communicator in response to selection of the first service provider of the first category.

3. A method according to claim 1 wherein the detecting step comprises at least one of the following steps:

detecting that a busy signal is obtained from the first telephone number;

detecting that a radiotelephone call to the first telephone number is repeatedly initiated during a predetermined time; and detecting that radiotelephone calls to a plurality of telephone numbers corresponding to service providers of the first category, including the first telephone number, are initiated during a predetermined time.

4. A method according to claim 1 where in the step of obtaining comprises the steps of:

identifying a geographic location of the wireless communicator; and wirelessly obtaining a listing of at least a second telephone number that corresponds to at least a second service provider of the first category in the geographic location.

5. A method according to claim 4 wherein the step of wirelessly obtaining comprises the step of wirelessly obtaining a Yellow Pages directory listing from the Internet, the Yellow Pages directory listing including the listing of at least a second telephone number that corresponds to at least a second service provider of the first category in the geographic location.

6. A method according to claim 4 wherein the step of identifying a geographic location comprises the step of identifying a geographic location of the wireless communicator using a Global Positioning System (GPS) receiver at the wireless communicator.

7. A method according to claim 4 wherein the step of wirelessly obtaining a listing comprises the steps of:

wirelessly obtaining a default display for telephone number listings;

displaying the default display on the wireless communicator; and wirelessly obtaining the listing of at least a second telephone number.

8. A method according to claim 7:

wherein the step of wirelessly obtaining the default display is preceded by the step of:

determining whether the default display can be obtained within a predetermined time;

wherein the step of wirelessly obtaining a default display comprises the step of wirelessly obtaining a default display if the default display can be obtained within the predetermined time; and wherein the step of displaying the default display comprises the step of displaying the default display if the default display can be obtained within the predetermined time.

9. A method according to claim 1 wherein the step of displaying is followed by the step of:

initiating a radiotelephone call to a telephone number in the at least part of the listing that is displayed on the wireless communicator, in response to selection of the telephone number.

10. A method of displaying information on a display of a wireless communicator, comprising the steps of:

wirelessly obtaining a default display for the wireless communicator if the default display can be wirelessly obtained within a predetermined time;

displaying the default display on the display of the wireless communicator if the default display was obtained within the predetermined time;

wirelessly obtaining the information; and displaying the information on the display of the wireless communicator.

11. A method according to claim 10 wherein the step of wirelessly obtaining a default display comprises the steps of:

wirelessly obtaining a web site home page for the wireless communicator from the Internet if the web site home page can be wirelessly obtained from the Internet within a predetermined time.

12. A method according to claim 11 wherein the information is at least one Yellow Pages listing and wherein the default display is a Yellow Pages web site home page.

13. A system for identifying a service provider from a wireless communicator, the system comprising:

means for initiating a radiotelephone call from the wireless communicator to a first telephone number that corresponds to a first service provider of a first category;

means for detecting that the radiotelephone call is not successfully completed;

means for obtaining at the wireless communicator, a listing of at least a second telephone number that corresponds to at least a second service provider of the first category in response to the means for detecting that the radiotelephone call is not successfully completed; and means for displaying at least part of the listing on the wireless communicator.

14. A system according to claim 13 wherein the means for initiating comprises:

means for displaying a prestored listing of service providers on the wireless communicator, including the first service provider of the first category; and means for initiating a radiotelephone call from the wireless communicator in response to selection of the first service provider of the first category.

15. A system according to claim 13 wherein the means for detecting comprises at least one of the following:

means for detecting that a busy signal is obtained from the first telephone number;

means for detecting that a radiotelephone call to the first telephone number is repeatedly initiated during a predetermined time; and means for detecting that radiotelephone calls to a plurality of telephone numbers corresponding to service providers of the first category, including the first telephone number, are initiated during a predetermined time.

16. A system according to claim 13 wherein the means for obtaining comprises:

means for identifying a geographic location of the wireless communicator; and means for wirelessly obtaining a listing of at least a second telephone number that corresponds to at least a second service provider of the first category in the geographic location.

17. A system according to claim 16 wherein the means for wirelessly obtaining comprises means for wirelessly obtaining a Yellow Pages directory listing from the Internet, the Yellow Pages directory listing including the listing of at least a second telephone number that corresponds to at least a second service provider of the first category in the geographic location.

18. A system according to claim 16 wherein the means for identifying a geographic location comprises a Global Positioning System (GPS) receiver.

19. A system according to claim 16 wherein the means for wirelessly obtaining a listing comprises:

means for wirelessly obtaining a default display of telephone number listings;

means for displaying the default display on the wireless communicator; and means for wirelessly obtaining the listing of at least a second telephone number.

20. A system according to claim 19 further comprising:

means for determining whether the default display can be obtained within a predetermined time; and means for bypassing the means for wirelessly obtaining a default display and the means for displaying the default display if the default display cannot be obtained within the predetermined time.

21. A system according to claim 13 further comprising:

means for initiating a radiotelephone call to a telephone number in the at least part of the listing that is displayed on the wireless communicator, in response to selection of the telephone number.

22. A system for displaying information on a display of a wireless communicator, comprising:

means for wirelessly obtaining a default display for the wireless communicator if the default display can be wirelessly obtained within a predetermined time;

means for displaying the default display on the display of the wireless communicator if the default display was obtained within the predetermined time;

means for wirelessly obtaining the information; and means for displaying the information on the display of the wireless communicator.

23. A system according to claim 22 wherein the means for wirelessly obtaining a default display comprises:

means for wirelessly obtaining a web site home page for the wireless communicator from the Internet if the web site home page can be wirelessly obtained from the Internet within a predetermined time.

24. A system according to claim 22 wherein the information is at least one Yellow Pages listing and wherein the default display is a Yellow Pages web site home page.

25. A wireless communicator comprising:

a radiotelephone transceiver;

a display;

a user input device; and a controller that initiates a radiotelephone call from the radiotelephone transceiver to a first telephone number that corresponds to a first service provider of a first category, that detects that the radiotelephone call is not successfully completed, that obtains a listing of at least a second telephone number corresponding to at least a second service provider of the first category upon detecting that the radiotelephone call is not successfully completed, and that displays at least part of the listing on the display.

26. A wireless communicator according to claim 25 wherein the controller displays a prestored listing of service providers on the display, including the first service provider of the first category, and initiates the radiotelephone call from the radiotelephone transceiver in response to selection of the first service provider of the first category by the user input device.

27. A wireless communicator according to claim 25 wherein the controller detects that the radiotelephone call is not successfully completed by detecting that a busy signal is obtained from the first telephone number, by detecting that a radiotelephone call to the first telephone number is repeatedly initiated during a predetermined time; and/or by detecting that radiotelephone calls to a plurality of telephone numbers corresponding to service providers of the first category, including the first telephone number, are initiated during a predetermined time.

28. A wireless communicator according to claim 25 wherein the controller obtains a listing of at least a second telephone number corresponding to at least a second service provider of the first category by identifying a geographic location of the wireless communicator, and by wirelessly obtaining a listing of at least a second telephone number that corresponds to at least a second service provider of the first category in the geographic location.

29. A wireless communicator according to claim 28 wherein the controller obtains a listing of at least a second telephone number corresponding to at least a second service provider of the first category by wirelessly obtaining a Yellow Pages directory listing from the Internet, the Yellow Pages directory listing including the listing of at least a second telephone number that corresponds to at least a second service provider of the first category in the geographic location.

30. A wireless communicator according to claim 28 further comprising a Global Positioning System (OPS) receiver, and wherein the controller identifies a geographic location of the wireless communicator using the GPS receiver.

31. A wireless communicator according to claim 28 wherein the controller wirelessly obtains a listing by wirelessly obtaining a default display for telephone number listings, displaying the default display on the display, and wirelessly obtaining the listing of at least a second telephone number.

32. A wireless communicator according to claim 31 wherein the controller determines whether the default display can be obtained within a predetermined time, and does not wirelessly obtain and display the default display if the default display cannot be obtained within the predetermined time.

33. A wireless communicator according to claim 25 wherein the controller initiates a radiotelephone call to a telephone number in the at least part of the listing that is displayed on the display, in response to selection of the telephone number by the user input device.

34. A wireless communicator comprising:

a radiotelephone transceiver;

a display;

a user input device; and a controller that wirelessly obtains a default display for the wireless communicator if the default display can be wirelessly obtained within a predetermined time, that displays the default display on the display if the default display was obtained within the predetermined time and that wirelessly obtains the information and displays the information on the display.

35. A wireless communicator according to claim 34 wherein the controller wirelessly obtains a default display by wirelessly obtaining a web site home page for the wireless communicator from the Internet if the web site home page can be wirelessly obtained from the Internet within a predetermined time.

36. A wireless communicator according to claim 35 wherein the information is at least one Yellow Pages listing and wherein the default display is a Yellow Pages web site home page.

* * * * *